(12) United States Patent
Fraedrich et al.

(10) Patent No.: US 6,988,333 B2
(45) Date of Patent: Jan. 24, 2006

(54) PLANT INJECTOR

(75) Inventors: Bruce R. Fraedrich, Lake Wylie, SC (US); E. Thomas Smiley, Fort Mill, SC (US)

(73) Assignee: F.A. Bartlett Tree Expert Company, Stamford, CT (US)

( * ) Notice: Subject to any disclaimer, the term of this patent is extended or adjusted under 35 U.S.C. 154(b) by 0 days.

(21) Appl. No.: 10/655,258

(22) Filed: Sep. 4, 2003

(65) Prior Publication Data

US 2005/0050795 A1 Mar. 10, 2005

(51) Int. Cl.
*A01G 29/00* (2006.01)

(52) U.S. Cl. ........................................... 47/57.5
(58) Field of Classification Search ................ 47/57.5, 47/48.5; 604/207, 208, 236, 238, 215, 217, 604/248
See application file for complete search history.

(56) References Cited

U.S. PATENT DOCUMENTS

| | | | |
|---|---|---|---|
| 318,609 A | 5/1885 | Escourrou | |
| 1,583,900 A * | 5/1926 | Schmittutz | 47/57.5 |
| 2,821,944 A | 2/1958 | Blake | |
| 3,124,904 A | 3/1964 | Mauget | |
| 3,130,519 A | 4/1964 | Mauget | |
| 3,286,401 A | 11/1966 | Mauget | |
| 3,304,655 A | 2/1967 | Mauget | |
| 3,506,008 A * | 4/1970 | Huck | 604/193 |
| 3,864,874 A | 2/1975 | Norris et al. | |
| 4,011,685 A | 3/1977 | Boyd et al. | |
| 4,028,846 A | 6/1977 | Floyd et al. | |
| 4,103,456 A | 8/1978 | Hendrixson et al. | |
| 4,176,495 A | 12/1979 | Dale | |
| 4,365,440 A | 12/1982 | Lenardson | |
| 4,583,978 A * | 4/1986 | Porat et al. | 604/208 |
| 4,596,088 A | 6/1986 | Graber | |
| 4,648,532 A * | 3/1987 | Green | 222/82 |
| 4,833,824 A | 5/1989 | Cronenwett et al. | |
| 4,908,983 A | 3/1990 | Mazur et al. | |
| 4,958,622 A * | 9/1990 | Selenke | 600/578 |
| 4,989,366 A | 2/1991 | DeVlieger | |
| 5,031,357 A | 7/1991 | Macbeth | |
| 5,046,281 A | 9/1991 | Murphy | |
| 5,249,391 A * | 10/1993 | Rodgers | 47/57.5 |
| 5,355,619 A | 10/1994 | West et al. | |
| 5,425,201 A | 6/1995 | Merving | |
| 5,443,641 A * | 8/1995 | Helsing et al. | 118/407 |
| 5,477,638 A | 12/1995 | Corradi et al. | |
| 5,505,021 A | 4/1996 | Merving | |
| 5,515,646 A | 5/1996 | Newbanks | |
| 5,827,235 A * | 10/1998 | Beaver | 604/236 |
| 5,951,526 A * | 9/1999 | Korisch et al. | 604/208 |
| 5,956,894 A | 9/1999 | Eldridge | |
| 6,032,411 A | 3/2000 | Foust | |
| 6,219,963 B1 * | 4/2001 | Wang | 47/48.5 |
| 6,405,480 B1 | 6/2002 | Martin | |
| 2002/0184819 A1 * | 12/2002 | Huang | 47/48.5 |

* cited by examiner

*Primary Examiner*—Michael J. Carone
*Assistant Examiner*—Susan C. Alimenti
(74) *Attorney, Agent, or Firm*—Adams Evans P.A.

(57) ABSTRACT

A reusable plant injector includes a sealed housing defining a reservoir for containing a pressurized fluid, the housing including an elongated neck having an inner end in fluid communication with the reservoir and an outer end defining a nozzle. An inlet valve is disposed in the housing in fluid communication with the reservoir for receiving a supply of fluid therethrough. A control valve is provided for selectively starting and stopping a flow of pressurized fluid from the reservoir through the neck and out of the nozzle. A method is also provided for treating a plant or group of plants using the described plant injector.

8 Claims, 6 Drawing Sheets

PLANT INJECTOR

BACKGROUND OF THE INVENTION

This invention relates generally to plant injectors and more particularly to a reusable, pressurized tree injector. For several reasons it is often desirable to treat diseases, nutrient deficiencies, growth problems, or insect infestations of plants, particularly trees, by direct injection into the plant of treatment fluids, such as nutriment, antibiotics, growth regulators, or systemic pesticides. Because the fluids used may be toxic to humans or animals or otherwise harmful to plants not undergoing treatment, the laws frequently require that the applicator remain in close proximity to the plant during the treatment process, in order to guard against spills or other accidents, even though the treatment process could otherwise be out carried out unattended from a technical standpoint.

Accordingly, the prior art has developed several devices to speed the application process by using pressurized injection. One known type of injection equipment comprises a bulk tank containing the treatment fluid, pressurized by gas or by a pump, with the fluid being delivered through an injection gun or nozzle. However, this type of equipment is heavy, inconvenient to move around, and expensive. To address these shortcomings, several types of prior art disposable injectors have been developed, comprising a small pressurized capsule of treatment fluid with a needle. An injector of this type may be set into a hole in a tree and left for the injection process to complete while other injectors are set in other trees. However, disposable injectors are wasteful of materials because they cannot be reused or adequately cleaned prior to disposal.

Accordingly, it is an object of the present invention to provide a portable, reusable, pressurizable plant injector.

It is another object of the invention to provide a fluid injector with controlled dispensing.

BRIEF SUMMARY OF THE INVENTION

These and other objectives are met by the present invention, which according to one embodiment provides a reusable plant injector that includes a sealed housing defining a reservoir for containing a pressurized fluid, which housing includes an elongated neck having an inner end in fluid communication with the reservoir and an outer end defining a nozzle. An inlet valve is installed in the housing in fluid communication with the reservoir for receiving a supply of fluid therethrough. A control valve is provided for selectively starting and stopping a flow of pressurized fluid from the reservoir through the neck and out of the nozzle.

According to another embodiment of the present invention, a seating surface is disposed at the inner end of the neck, and the control valve includes a shaft having an upper end and a lower end, the lower end including a tapered nose which engages the seating surface when the control valve is in a closed position.

According to another embodiment of the present invention, the housing includes an open-ended body which defines the reservoir, the neck, and a tapered transition section disposed between the reservoir and the neck. A cap is sealingly attached to the body and encloses the open end of the body.

According to another embodiment of the present invention the control valve passes through the cap, and the control valve and the shaft cooperatively define means for retaining the control valve in a selected flow position.

According to another embodiment of the present invention the control valve passes through the cap, and the control valve includes threads disposed at its upper end which engage complementary threads disposed in the cap, such that rotation of the control valve causes the control valve to move towards or away from the seating surface.

According to another embodiment of the present invention, at least one seal is disposed around the shaft of the control valve.

According to another embodiment of the present invention, an upper seal is disposed around the shaft near the upper end thereof and a lower seal is disposed around the shaft near the lower end thereof. The upper seal blocks the flow of fluid between the shaft and the housing and the lower seal blocks the flow of fluid between the shaft and the seating surface.

According to another embodiment of the present invention, the fit of the lower seal against the seating surface is chosen such that the lower seal will allow leakage at a lower pressure than the upper seal.

According to another embodiment of the present invention, the plant injector includes means for relieving pressure which exceeds a predetermined level from the housing.

According to another embodiment of the present invention, a relief valve is disposed in fluid communication with the housing is normally closed and opens to release fluid from the housing when the pressure of the fluid exceeds a predetermined level.

According to another embodiment of the present invention, an overpressure plug is disposed in fluid communication with the housing. The overpressure plug normally seals a relief vent formed in the housing. The overpressure plug is forced out of the relief vent when the pressure of the fluid exceeds a predetermined level.

According to another embodiment of the present invention, a method of injecting fluid into a plant comprises providing a reusable plant injector having a sealed reservoir for containing a selected fluid, a nozzle, and a control valve for controlling the flow of fluid from the nozzle. The selected fluid is introduced into the plant injector and pressurized. A hole is formed in the plant in communication with a preselected internal structure of the plant. The plant injector is inserted said into the plant and the control valve is opened so as to admit pressurized fluid into the internal structure of the plant.

According to another embodiment of the present invention, the plant is a tree and the internal structure is the xylem of the tree.

According to another embodiment of the present invention, the method of injection further includes allowing a desired quantity of the fluid to be injected into the plant, closing the control valve, whereby any residual fluid is retained in the plant injector; and removing the plant injector from the plant.

According to another embodiment of the present invention, the fluid is a systemic insecticide.

According to another embodiment of the present invention, the fluid is an antibiotic.

According to another embodiment of the present invention, the fluid is a nutriment.

According to another embodiment of the present invention, the fluid is an antibiotic.

According to another embodiment of the present invention, the fluid is a plant growth regulator.

According to another embodiment of the present invention, the fluid is a plant miticide.

According to another embodiment of the present invention, the fluid is a nematicide.

According to another embodiment of the present invention, a method of treating a selected number of plants comprises providing a plurality of reusable plant injectors each having a sealed reservoir for containing a selected fluid, a nozzle, and a control valve for controlling the flow of the fluid from the nozzle. The selected fluid is introduced into each of the plant injectors and pressurized. A hole is formed in a first one of the plants in communication with a preselected internal structure of the plant. A first one of the plant injectors is inserted into the first one of the plants, and its control valve is opened so as to admit pressurized fluid into the internal structure of the plant The, without waiting for the first one of the injectors to be completely emptied of fluid, the steps are repeated of forming a hole, inserting a plant injector, and opening a control valve, for subsequent ones of the plants, using subsequent ones of the plant injectors. After the fluid has been injected into each one of the selected plants, the plant injectors are removed from the plants.

According to another embodiment of the present invention, the control valve of each plant injector is closed before it is removed from the plant.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
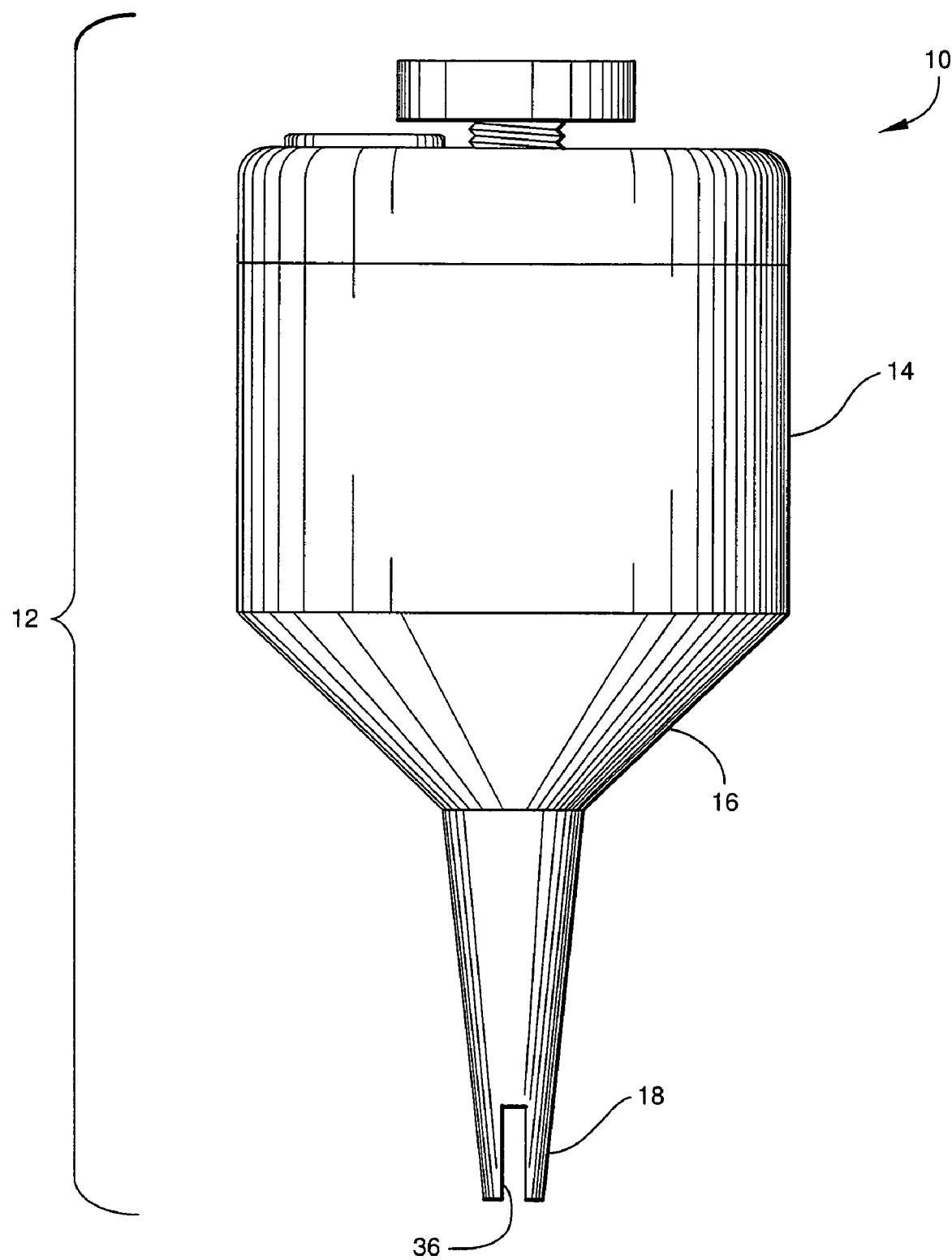
FIG. 1 is a schematic side view of a plant injector constructed in accordance with the present invention.

Referring to the drawings wherein identical reference numerals denote the same elements throughout the various views, FIG. 1 shows a side view of a plant injector 10. The basic components of the plant injector 10 are a sealed housing 12 including a reservoir 14, a transition portion 16, and a nozzle 18.

Figure 2:
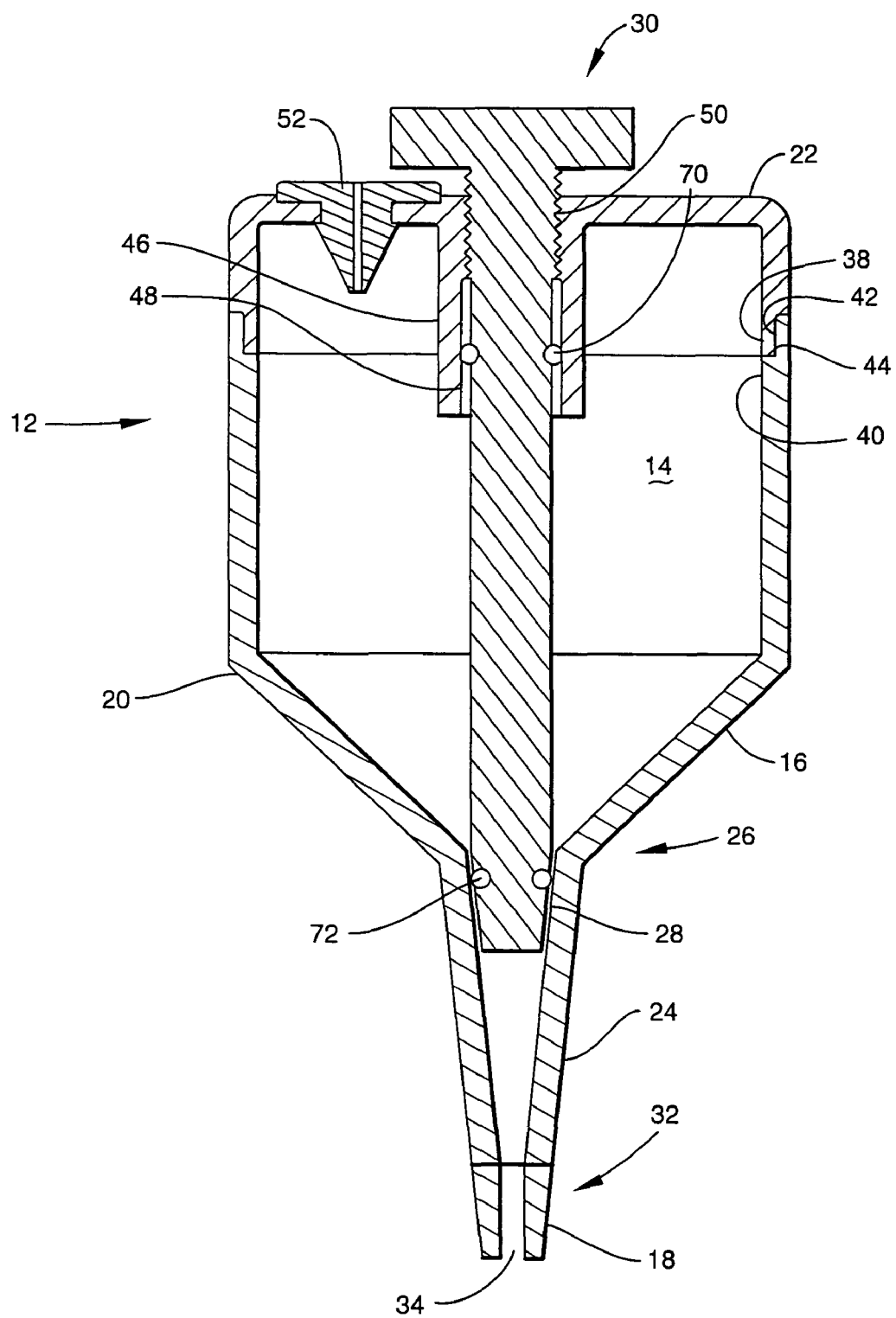
FIG. 2 is a cross-sectional view of the plant injector of FIG. 1.

FIG. 2 is a cross-sectional view showing the plant injector 10 in more detail. The housing 12 is a sealed, hollow enclosure. In the illustrated example the housing 12 comprises a body 20 and a cap 22 which are joined together to form a sealed assembly. It is also possible that the housing 12 could be a one-piece assembly or could be fabricated from more than two components.

The body 20 is a hollow structure which includes, sequentially along its longitudinal axis, a reservoir 14 for holding the fluid, a tapered transition portion 16, and an elongated neck 24. The body 20 may be molded in a known manner as a single unitary component from a chemical-resistant material, such as known types of polymers. If desired, the body 20 may be made translucent or transparent so that the fluid contents can be observed. The inner end 26 of the neck 24 defines a tapered seating surface 28 for a control valve 30, described in more detail below. The outer end 32 of the neck 24 defines a nozzle 18. In this instance the nozzle 18 comprises a discharge opening 34 (see FIG. 1) at the very end of the neck 24 as well as an array of one or more longitudinal slots 36 disposed about the periphery of the neck 24 which allow the fluid to flow out laterally.

The cap 22 is attached to the upper end of the body 20. The cap 22 has a peripheral edge 38 which mates with a peripheral edge 40 of the body to form a sealed joint. The joint may comprise matching rabbets 42 and 44 formed in the respective peripheral edges of the body 20 and the cap 22. The two components may be joined by any method that will result in a leakproof joint, for example ultrasonic welding, thermal bonding, adhesives, or a snap-fit joint. The cap 22 includes a cylindrical central boss 46 that serves to engage and locate the control valve 30. The central boss 46 protrudes into the interior of the plant injector 10 and has a central bore 48 formed therethrough. A set of threads 50 are formed in a portion of the bore 46.

An inlet valve 52 is disposed in the cap 22. The inlet valve 52 is a one-way type valve that allows fluid to enter the plant injector 10 but prevents fluid from exiting. In the illustrated example the inlet valve 52 is a duckbill valve of a known type which seals by way of a pair of resilient flaps. Other types of valves which allow one-way flow may be substituted.

Figure 6:
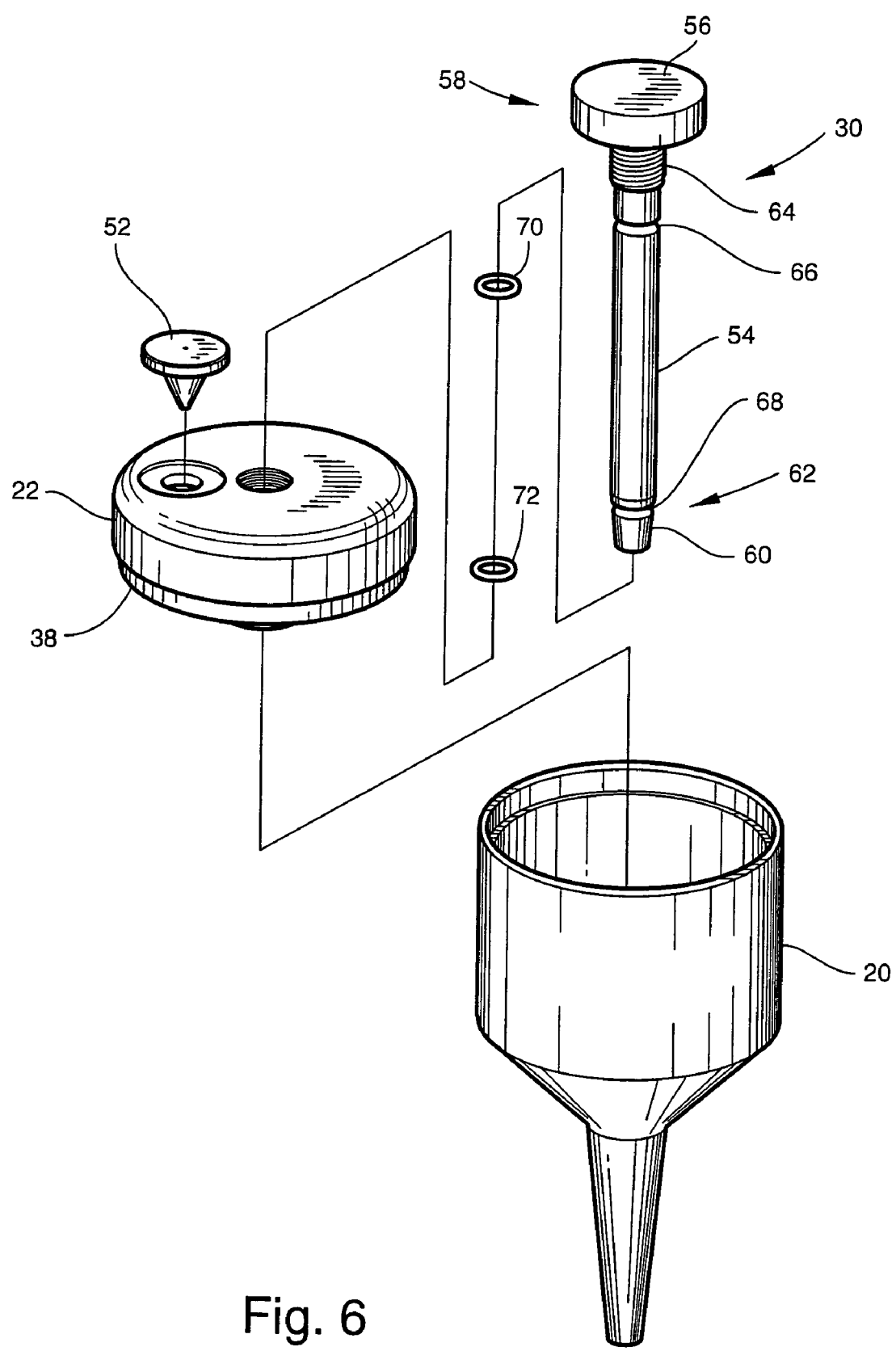
FIG. 6 is an exploded view of the components of a plant injector constructed in accordance with the present invention.

The control valve 30 (see FIG. 6) is disposed inside the plant injector 10. The control valve 30 comprises a shaft 64 having a disk-shaped knob 56 disposed at its upper end 58, and a tapered nose 60 formed at its lower end 62. External threads 64 are formed on the shaft 54 near the control knob 56. A pair of spaced-apart seal grooves 66 and 68 are formed in the periphery of the shaft 54. When assembled, as shown in FIG. 2, the shaft 54 passes through the central boss 46 of the cap 22 and into the interior of the reservoir 14. The threads 64 of the shaft 54 engage the threads 50 in the central boss 46. When the shaft 54 is installed and fully screwed down, the nose 60 bears against the seating surface 28 in the neck 24. Upper and lower seals 70 and 72, for example synthetic rubber O-rings, are installed into the seal grooves 66 and 68. The upper seal 70 prevents leakage of fluid between the control valve 30 and the bore 48, while the lower seal 72 seals against the seating surface 28. The control valve seal is thus provided by a combination of the tapered fit of the nose 60 with the seating surface 28, and the lower seal 72.

Figure 3:
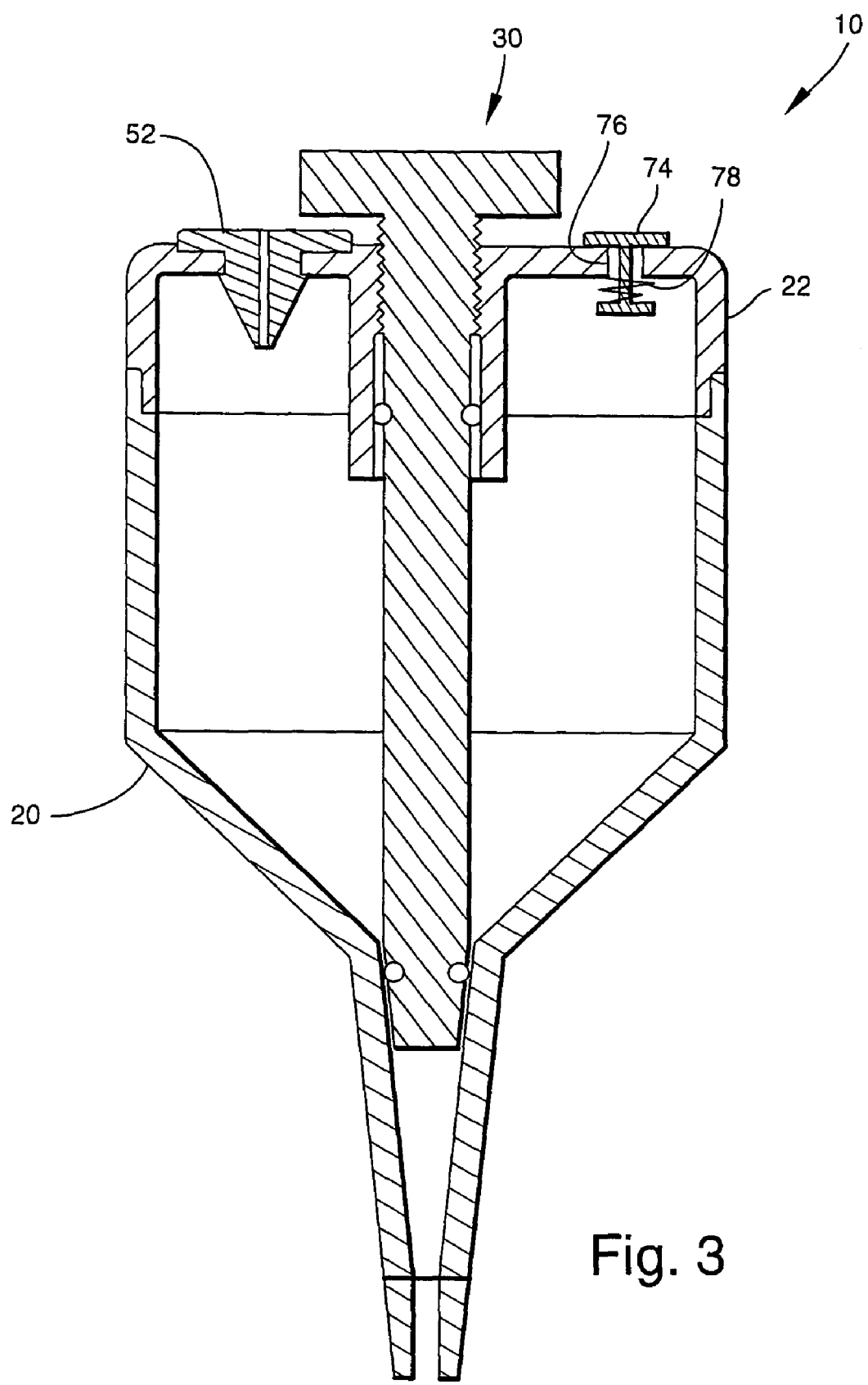
FIG. 3 is a cross-sectional view of a plant injector including a pressure relief valve.

FIG. 3 illustrates a variation of the plant injector 10 which includes a relief valve 74. The relief valve 74 is disposed in a relief vent 76 formed through the cap 22. In the illustrated example the relief valve 74 is a simple poppet-type valve which is normally kept closed by a spring 78. If the pressure exceeds a preselected level, the spring force is overcome, opening the relief valve 74 and releasing the excess pressure.

Figure 4:
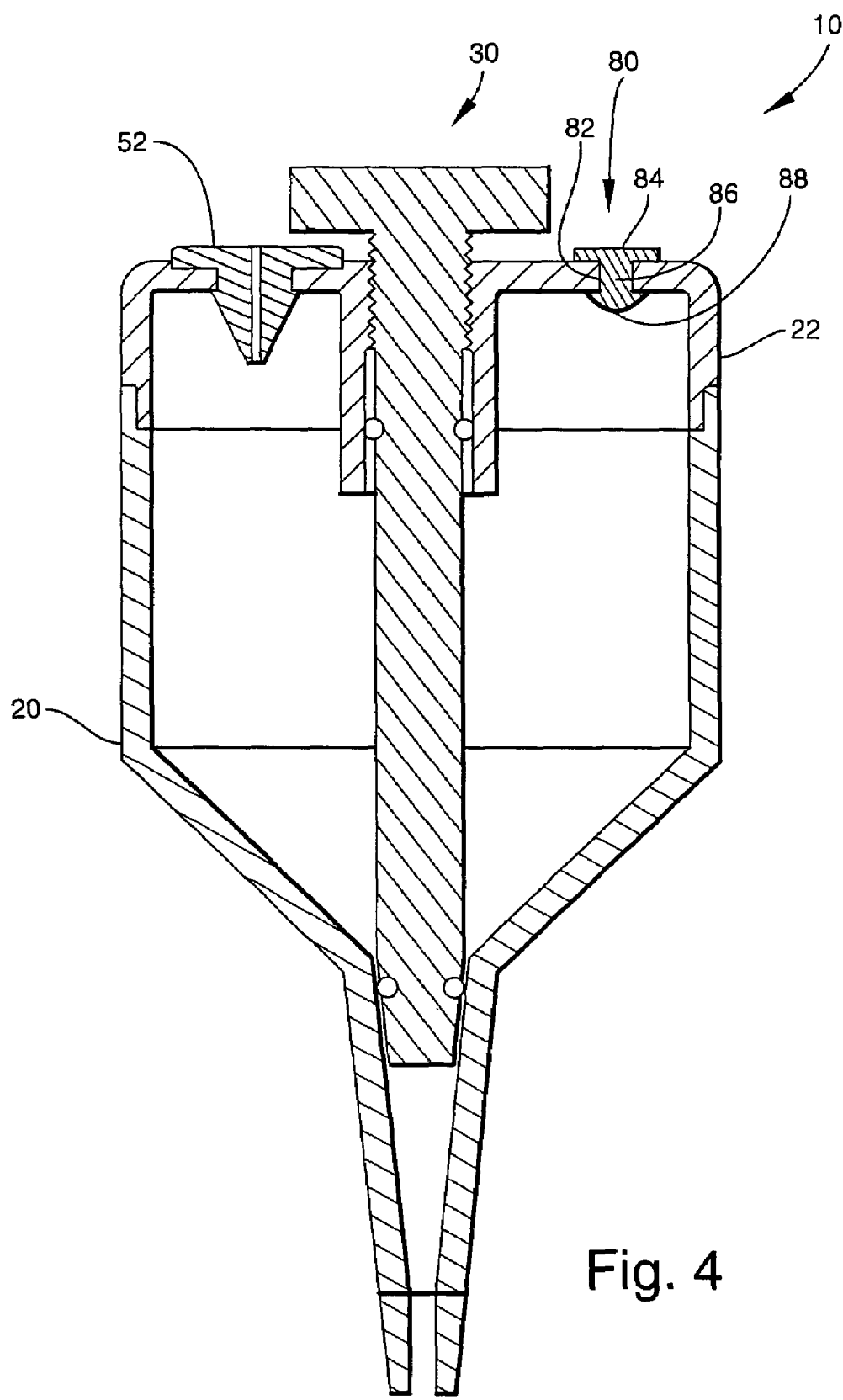
FIG. 4 is a cross-sectional view of a plant injector including a pressure relief plug.

FIG. 4 illustrates another variation of the plant injector 10 which includes an overpressure plug 80. The overpressure plug 80 is installed in a relief vent 82 formed through the cap 22. The overpressure plug 80 includes a head 84, a shaft 86, and a retention flange 88. The retention flange 88 is a structure such as an annular flap or barb. The dimensions of the retention flange 88 are selected so that the overpressure plug 80 may be easily inserted into the relief vent 82, but that the overpressure plug 80 will resist being withdrawn until the internal pressure exceeds a predetermined level. Once this level is exceeded, the overpressure plug 80 is blown out, releasing the excess pressure.

As shown in FIGS. 2, 3, and 4, the fit of the upper and lower seals 70 and 72 against the surfaces they contact (known as their "diametrical squeeze") may be varied as required. In the illustrated example, the dimensions of the lower seal 72, the valve nose 60 and groove 68, and the seating surface 28 are selected so that there will be a lesser diametrical squeeze (compression) on the lower seal 72 than on the upper seal 70. This effectively makes the lower seal 72 less resistant to leakage that the upper seal 70. In case of excessive pressurization, the lower seal 72 will reach the limit of the pressure it can hold before the upper seal 70 reaches its pressure limit. This will cause the fluid to leak past the lower seal 72 out the nozzle 18 in a direction away from the user, thus lowering the pressure so that the upper seal 70 does not fail. This pressure relief feature may be used instead of, or in conjunction with, the relief valve 74 or the overpressure plug 80 described above.

The plant injector 10 is placed in use by first checking to make sure that the unit is assembled and has no visible leaks. The shaft 54 is screwed down tight using the control knob 56. The reservoir 14 is then filled with a selected pressurized fluid. A variety of fluids may be used depending upon the particular application. Examples of fluids include insecticides, nutriments, antibiotics, growth regulators, plant miticides, and nematicides. The quantity of fluid may be varied to suit a particular application. In the illustrated example the capacity of the plant injector 10 is about 40 ml (1.4 oz.) This filling and pressurization may be done by various methods. For example, non-pressurized fluid may be introduced through the inlet valve 52 from a container with a needle or tube. Then, the plant injector 10 may be pressurized by introducing compressed gas through the inlet valve 52, for example using an air compressor. Alternatively, the fluid may be introduced to the reservoir 14 in a pressurized state, for example by using a mechanical pump (not shown). The plant injector 10 is pressurized to a level which allows a desired rate of discharge while not exceeding the capability of the plant injector 10 to remain sealed, and which is also low enough so that the plant injector 10 will not be dislodged from the plant during the injection process described below. A suitable pressure may be in the range of about 0 kPa (0 PSI) to about 6.9 kPa (25 PSI). The pressure relief features described above release any pressure above this preselected level.

Figure 5:
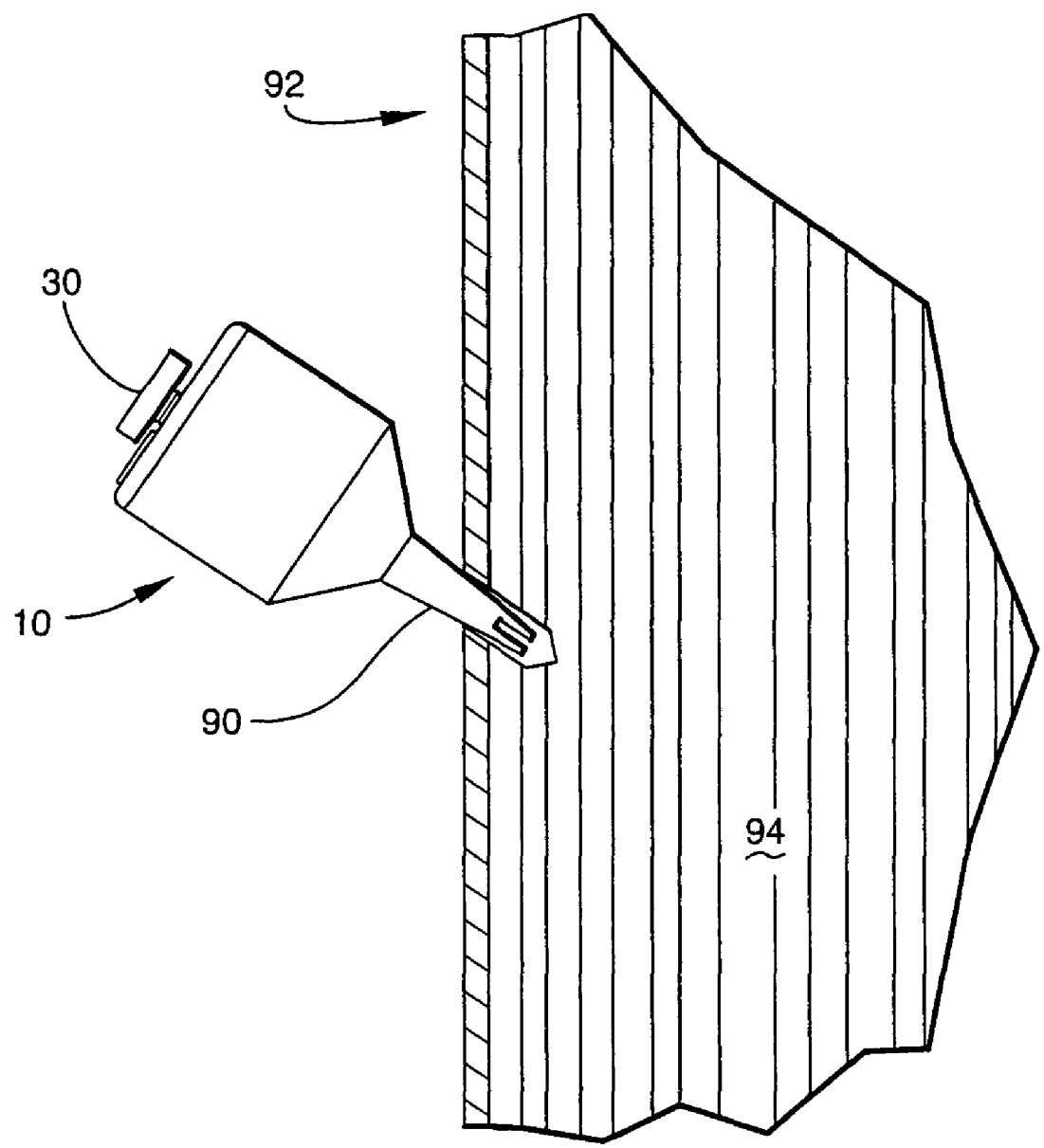
FIG. 5 is a cross-sectional view of the plant injector in use.

Referring now to FIG. 5, the filled and pressurized plant injector 10 is then inserted into a hole 90 bored into a tree 92 so that the nozzle 18 is in fluid communication with the xylem 94 of the tree 92. The tapered neck 24 allows the plant injector 10 to be wedged into the hole 90 so that it will remain secure during the injection process. The control valve 30 is then opened by unscrewing the control knob 56, allowing the pressurized fluid to flow out of the nozzle 18. The pressure causes the fluid to be forced into the tree's xylem, which makes the plant injector 10 empty faster than if it were not pressurized. This greatly shortens the time required to perform an injection. For example, using a non-pressurized injector to inject about 10 ml (0.3 oz.) of fluid into a tree through a 5 mm (3/16 in.) diameter hole would require about 10 minutes to about 20 minutes, whereas the plant injector 10 of the present invention, pressurized to about 138 kPa (20 PSI) can inject the same quantity of fluid in about 2 minutes. When the injection process is complete, the control valve 30 is closed, preventing leakage of any residual fluid, and the plant injector 10 is withdrawn from the tree 90. The plant injector 10 may be refilled and used again for a subsequent treatment.

The plant injector 10 of the present invention may be employed using various methods. Typically each property will have several trees to be treated. Local laws often require that the applicator remain either on the property or within a line of sight of a tree during the injection process. That is, the tree may not be left completely unattended. The applicator may prepare a plurality of plant injectors 10 for use before beginning the process. Each plant injector 10 is filled with the proper fluid and pressurized as described above. In a first method of application, the applicator may drill a hole in a first tree, insert the pressurized plant injector 10 into the hole, open the control valve 30, wait for the plant injector 10 to be emptied, remove the injector, and then move on to the next tree, repeating the same process.

The applicator may also use an alternative method. After a first plant injector 10 is set in a first tree, without waiting for the plant injector 10 to be completely emptied, the applicator moves on to a second tree, drills a hole, inserts a second pressurized plant injector 10, and opens the control valve 30. This process may be repeated for any number of trees, so long as the requirements for remaining in sight of each tree are complied with. When all of the plant injectors 10 have been set and opened, the applicator may then go back remove the empty injectors. Using this method, The overall time needed to treat a group of trees is greatly reduced, because the time ordinarily spent waiting for the plant injector 10 to empty may be used in moving to the next tree and setting a subsequent injector.

The foregoing has described a plant injector having a sealed housing defining a reservoir for containing a pressurized fluid, the housing including an elongated neck having an inner end in fluid communication with said reservoir and an outer end defining a nozzle; an inlet valve disposed in said housing in fluid communication with the reservoir for receiving a supply of fluid therethrough; and a control valve for selectively starting and stopping a flow of pressurized fluid from the reservoir through the neck and out of said nozzle. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation—the invention being defined by the appended claims.

What is claimed is:

1. A reusable plant injector, comprising:
    a sealed housing defining a reservoir for containing a pressurized fluid, said housing including an elongated neck having an inner end in fluid communication with said reservoir and an outer end defining a nozzle, said housing comprising;
        an open-ended body which defines said reservoir and said neck, and a tapered transition section disposed between said reservoir and said neck, wherein a seating surface is disposed at said inner end of said neck; and
        a cap sealingly attached to said body which encloses the open end of said body;
    an inlet valve disposed in said housing in fluid communication with said reservoir for receiving a supply of fluid therethrough; and
    a control valve comprising a shaft passing entirely through said cap and having an upper end and a lower end said lower end including a tapered nose which engages said seating surface when said control valve is in closed position, said control valve operable to:

selectively prevent a flow of pressurized fluid from said reservoir by blocking fluid communication between said reservoir and said nozzle; and selectively allow a flow of pressurized fluid out of said nozzle by permitting fluid communication between said reservoir and said nozzle, wherein said housing and said shaft cooperatively define means for retaining said control valve in a selected flow position.

2. The reusable plant injector of claim 1 wherein said control valve includes threads disposed at said upper end which engage complementary threads disposed in said cap, such that rotation of said control valve causes said control valve to move towards or away from said seating surface.

3. The reusable plant injector of claim 1 further comprising at least one seal disposed around said shaft of said control valve.

4. The reusable plant injector of claim 3 wherein an upper seal is disposed around said shaft near said upper end thereof and a lower seal is disposed around said shaft near said lower end thereof, wherein said upper seal blocks the flow of fluid between said shaft and said housing and said lower seal blocks the flow of fluid between said shaft and said seating surface.

5. The reusable plant injector of claim 4 wherein the fit of said lower seal against said seating surface is chosen such that said lower seal will allow leakage at a lower pressure than said upper seal.

6. The reusable plant injector of claim 1 further comprising means for relieving pressure which exceeds a predetermined level from said housing.

7. The reusable plant injector of claim 1 further comprising a relief valve disposed in fluid communication with said housing which is normally closed and which opens to release fluid from said housing when the pressure of said fluid exceeds a predetermined level.

8. The reusable plant injector of claim 1 further comprising an overpressure plug disposed in fluid communication with said housing which normally seals a relief vent formed in said housing, wherein said overpressure plug is adapted to be forced out of said relief vent when the pressure of said fluid within said housing exceeds a predetermined level.

* * * * *

UNITED STATES PATENT AND TRADEMARK OFFICE
CERTIFICATE OF CORRECTION

PATENT NO. : 6,988,333 B2
DATED : January 24, 2006
INVENTOR(S) : Fraedrich and Smiley It is certified that error appears in the above-identified patent and that said Letters Patent is hereby corrected as shown below:

<u>Column 7,</u>
Line 3, enter -- a -- after "in" and before "closed".

Signed and Sealed this

Fourth Day of April, 2006

JON W. DUDAS
*Director of the United States Patent and Trademark Office*